US012311771B2

(12) United States Patent
Luedtke et al.

(10) Patent No.: US 12,311,771 B2
(45) Date of Patent: May 27, 2025

(54) MULTI-LOSS MODE ELECTRIC MOTOR TORQUE CONTROL TECHNIQUES FOR ELECTRIFIED VEHICLES

(71) Applicant: FCA US LLC, Auburn Hills, MI (US)

(72) Inventors: Daniel R Luedtke, Beverly Hills, MI (US); Mustafa Mohamadian, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 265 days.

(21) Appl. No.: 18/189,611

(22) Filed: Mar. 24, 2023

(65) Prior Publication Data

US 2024/0317065 A1 Sep. 26, 2024

(51) Int. Cl.
*B60L 15/02* (2006.01)
*B60H 1/14* (2006.01)

(52) U.S. Cl.
CPC ............ *B60L 15/025* (2013.01); *B60H 1/143* (2013.01); *B60L 2240/423* (2013.01); *B60L 2240/425* (2013.01)

(58) Field of Classification Search
CPC .......... H02P 29/60; H02P 29/62; H02P 29/64; H02P 29/66; H02P 29/68; H02P 25/145; H02P 25/062; H02P 25/064; H02P 21/00; H02P 21/20; H02P 21/22; H02P 21/30; H02P 23/0027; H02P 23/07; H02P 6/08; H02P 27/08; H02P 2207/05; H02P 25/022; H02P 25/03; H02P 27/06; H02P 6/28; H02P 6/00; H02P 29/662; B60L 2240/423; B60L 2240/421; B60L 50/16; B60L 2240/429; B60L 15/025; B60L 2220/14; B60L 15/20; B60L 7/14; B60L 3/0046; B60L 2240/441; B60L 58/10; B60L 58/27; B60L 3/0061; B60L 2240/12; B60L 2250/26; B60L 15/2045; B60L 2240/461; B60L 7/16; B60L 2220/16; B60L 2240/443; B60L 50/51; B60L 2240/529; B60L 3/003
See application file for complete search history.

(56) References Cited

U.S. PATENT DOCUMENTS

| | | | |
|---|---|---|---|
| 6,573,675 B2 | 6/2003 | Schmitz et al. | |
| 7,847,501 B2 | 12/2010 | Baglino et al. | |
| 8,336,319 B2 | 12/2012 | Johnston et al. | |
| 8,970,147 B2 | 3/2015 | Baglino et al. | |
| 2010/0000713 A1 | 1/2010 | Takahashi et al. | |
| 2010/0090629 A1 | 4/2010 | Tang | |
| 2011/0072841 A1 | 3/2011 | Arai et al. | |
| 2023/0163378 A1* | 5/2023 | Wang .................. | H01M 10/425 318/139 |

* cited by examiner

*Primary Examiner* — Antony M Paul
(74) *Attorney, Agent, or Firm* — Jeremy J. Klobucar

(57) ABSTRACT

Multi-loss torque control systems and methods for an electric motor of an electrified vehicle include determining a torque command for the electric motor from a set of sensors, determining a speed loss for the electric motor based on an actual speed and a desired heat energy loss for the electric motor from the set of sensors, generating current commands for the electric motor based on its determined torque command and speed loss, controlling the electric motor using the generated current commands, capturing heat energy lost by the electric motor using a heat exchanger system, and using the captured heat energy in the heat exchanger system to heat a component of the electrified vehicle.

18 Claims, 4 Drawing Sheets

MULTI-LOSS MODE ELECTRIC MOTOR TORQUE CONTROL TECHNIQUES FOR ELECTRIFIED VEHICLES

FIELD

The present application generally relates to electrified vehicles and, more particularly, to multi-loss mode electric motor torque control techniques for electrified vehicles.

BACKGROUND

Electrified vehicles include one or more electric motors powered by a high voltage battery system and configured to generate drive torque for vehicle propulsion. Typically, the goal of an electrified vehicle is to operate the electric motor(s) at their maximum or most optimal efficiencies (i.e., operating points corresponding to the minimum or lowest possible energy losses) to achieve the best driving range performance (i.e., mileage or range per battery charge). In cold operating conditions, the electrified vehicles typically have designated heating systems to provide heat energy to certain systems (battery heater(s), defrosting, in-cabin heating, etc.). These heating systems are large/heavy and increase vehicle costs and packaging. Accordingly, while such conventional electrified vehicle systems may work well for their intended purpose, there exists an opportunity for improvement in the relevant art.

SUMMARY

According to one example aspect of the invention, a multi-loss torque control system for an electric motor of an electrified vehicle is presented. In one exemplary implementation, the multi-loss torque control system comprises a set of sensors configured to determine (i) an actual speed of the electric motor, (ii) a requested torque for generation by the electric motor, and (iii) a desired heat energy loss by the electric motor and a controller configured to selectively operate the electric motor in a multi-loss torque control mode including determining a torque command for the electric motor based on the requested drive torque, determining a speed loss for the electric motor based on the electric motor's actual speed and its desired heat energy loss, generating current commands for the electric motor based on its determined torque command and speed loss, controlling the electric motor using the generated current commands, capturing heat energy lost by the electric motor using a heat exchanger system, and using the captured heat energy in the heat exchanger system to heat a component of the electrified vehicle.

In some implementations, the controller is configured to utilize a first calibrated lookup table (LUT) to determine a speed delta based on the desired heat energy loss by the electric motor. In some implementations, the controller is configured to determine the speed loss as a sum of the actual speed and speed delta of the electric motor. In some implementations, the controller is further configured to utilize a second calibrated LUT to determine the current commands based on the torque command and the speed loss for the electric motor.

In some implementations, the component of the electrified vehicle is a high voltage battery system configured to power the electric motor. In some implementations, the set of sensors are further configured to determine an actual temperature of the high voltage battery system and enable the multi-loss torque control mode for the electric motor when the actual temperature is below a calibratable threshold. In some implementations, the component of the electrified vehicle is an in-cabin heating component of the electrified vehicle. In some implementations, the controller controls the electric motor irrespective of motor flux. In some implementations, the electric motor is an interior permanent magnet synchronous motor (IPMSM).

According to another example aspect of the invention, a multi-loss torque control method for an electric motor of an electrified vehicle is presented. In one exemplary implementation, the method comprises determining, by the controller, a torque command for the electric motor based on a requested torque for generation by the electric motor from the set of sensors, determining, by the controller, a speed loss for the electric motor based on an actual speed and a desired heat energy loss for the electric motor from the set of sensors, generating, by the controller, current commands for the electric motor based on its determined torque command and speed loss, controlling, by the controller, the electric motor using the generated current commands, capturing, by the controller, heat energy lost by the electric motor using a heat exchanger system, and using, by the controller, the captured heat energy in the heat exchanger system to heat a component of the electrified vehicle.

In some implementations, the method further comprises utilizing, by the controller, a first calibrated LUT to determine a speed delta based on the desired heat energy loss by the electric motor. In some implementations, the method further comprises determining, by the controller, the speed loss as a sum of the actual speed and speed delta of the electric motor. In some implementations, the method further comprises utilizing, by the controller, a second calibrated LUT to determine the current commands based on the torque command and the speed loss for the electric motor.

In some implementations, the component of the electrified vehicle is a high voltage battery system configured to power the electric motor. In some implementations, the set of sensors are further configured to determine an actual temperature of the high voltage battery system and the multi-loss torque control method for the electric motor is performed when the actual temperature is below a calibratable threshold. In some implementations, the component of the electrified vehicle is an in-cabin heating component of the electrified vehicle. In some implementations, the controller controls the electric motor irrespective of motor flux. In some implementations, the electric motor is an IPMSM.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional electrified vehicles operate their electric motor(s) to achieve maximum or optimal efficiency for optimal range (i.e., mileage per charge) performance. During cold operating conditions, these conventional electrified vehicles include designated heating systems for heating components, such as a high voltage battery system, before the electrified vehicle is able to proceed or drive. These conventional heating systems are large/heavy and increase vehicle costs and packaging needs.

Accordingly, techniques are presented herein for intentionally operating the electric motor(s) in an inefficient multi-loss mode that is less than an optimal efficiency and that generates excess heat energy. These techniques capture this heat energy that would otherwise be lost from the electric motor(s) and, in turn, use the heat energy for at least one of a plurality of electrified vehicle heating functionalities such as those described above. For example, this could be done only for a short period upon vehicle wake-up and at a beginning of a trip when maximum motor performance (i.e., output torque) is not needed. A first specialized (calibrated) look-up table (LUT) is used to determine motor current commands based on inputs of a torque command and loss speed. The loss speed is also determined from another specialized (calibrated) LUT based on a desired motor speed loss and irrespective of motor flux. These techniques are therefore applicable to any type of electric motor, ranging from alternating current (AC) induction motors to high-performance interior permanent magnet synchronous motors (IPMSMs).

Figure 1:
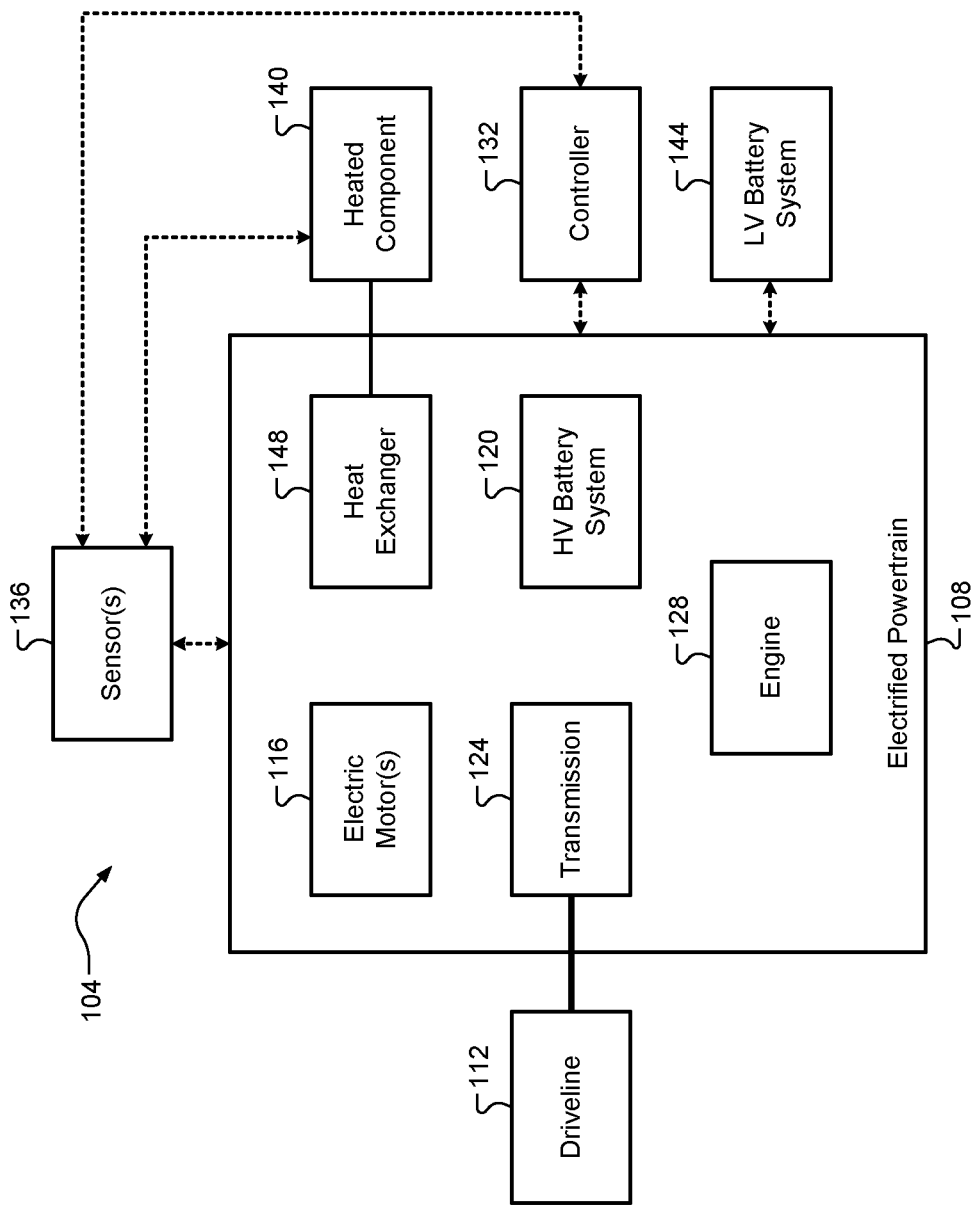
FIG. 1 is a functional block diagram an electrified vehicle having an electric motor and an example multi-loss motor torque control system according to the principles of the present application.

Referring now to FIG. 1, a functional block diagram of an electrified vehicle 100 having an example multi-loss electric motor torque control system 104 according to the principles of the present application is illustrated. The electrified vehicle 100 includes an electrified powertrain 108 configured to generate and transfer drive torque to a driveline 112 for vehicle propulsion. The electrified powertrain 108 includes one or more electric motors 116 powered by a high voltage (HV) battery system 120 and configured to generate drive torque that is then transferred to the driveline 112 via a transmission 124 such as an automatic transmission. While the electrified powertrain 108 could include two or more electric motors 116 arranged in any suitable configuration (series, parallel, etc.), only one electric motor 116 is generally referred to herein for simplicity. The electrified powertrain 108 could also include an optional internal combustion engine 128 configured to combust an air and fuel (e.g., gasoline) mixture to generate additional drive torque that could be used for vehicle propulsion or for other purposes, such as for conversion from mechanical to electrical energy for recharging the high voltage battery system 120. A controller 132 controls operation of the electrified vehicle 100 and, primarily, operation of the electrified powertrain 108 as now described in greater detail. The controller 132 receives a torque request from an operator or driver of the electrified vehicle 100 (e.g., via a driver interface, such as an accelerator pedal).

This torque request is measured or determined by one of a set of sensors 136. The set of sensors 136 are also configured to measure or determine other critical operating parameters for the purposes of the present application, such as, but not limited to, an ambient temperature, a temperature of a heated component 140 (e.g., the high voltage battery system 120), a state of charge (SOC) of the high voltage battery system 120, and an actual speed of the electric motor 116. While the heated component 140 is primarily described as the high voltage battery system 120 herein, it will be appreciated that the heated component 140 could be other suitable components such as an in-cabin heating component.

Figure 4:
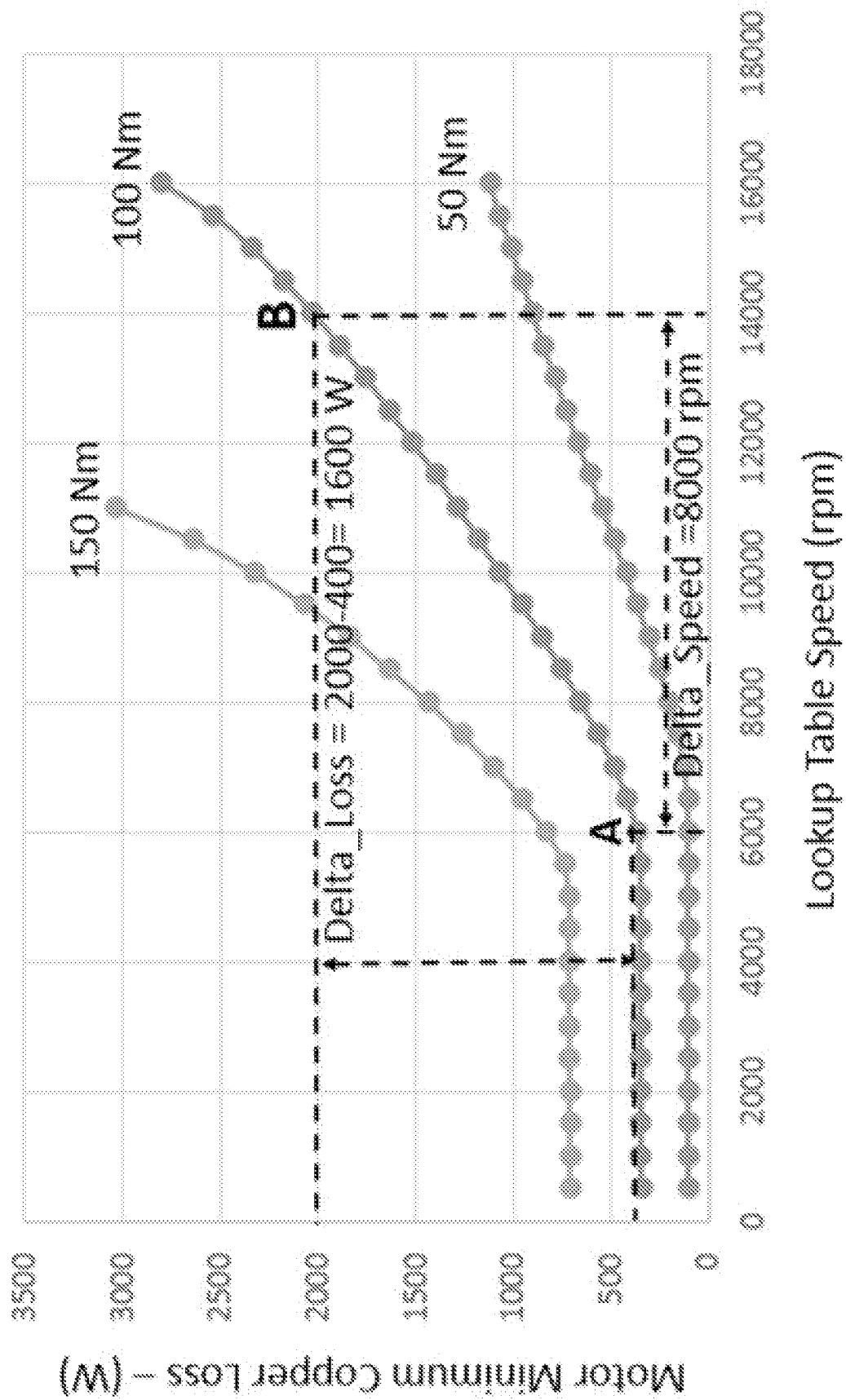
FIG. 4 is a plot of example electric motor power losses versus lookup table (LUT) speeds according to the principles of the present application.

A low voltage battery system 144 is configured to power low voltage (e.g., 12 volt) accessory loads, such as conventional heater(s) for components of the electrified vehicle 100. As part of the multi-loss torque control mode of the electrified powertrain 108 (i.e., the electric motor 116) according to the present application, the electrified vehicle 100 further includes a heat exchanger 148 that captures excess heat energy expelled from the electric motor 116 that would otherwise be lost or dissipated and uses this heat energy for heating of the heated component 140 (e.g., the high voltage battery system 120). FIG. 4 illustrates a plot of example power losses (in watts, or W) versus electric motor lookup table speeds (LUT speeds), which will become more relevant as explained in greater detail below. This multi-loss torque control mode will now be described in greater detail with reference to additional figures of the present application.

Figure 2:
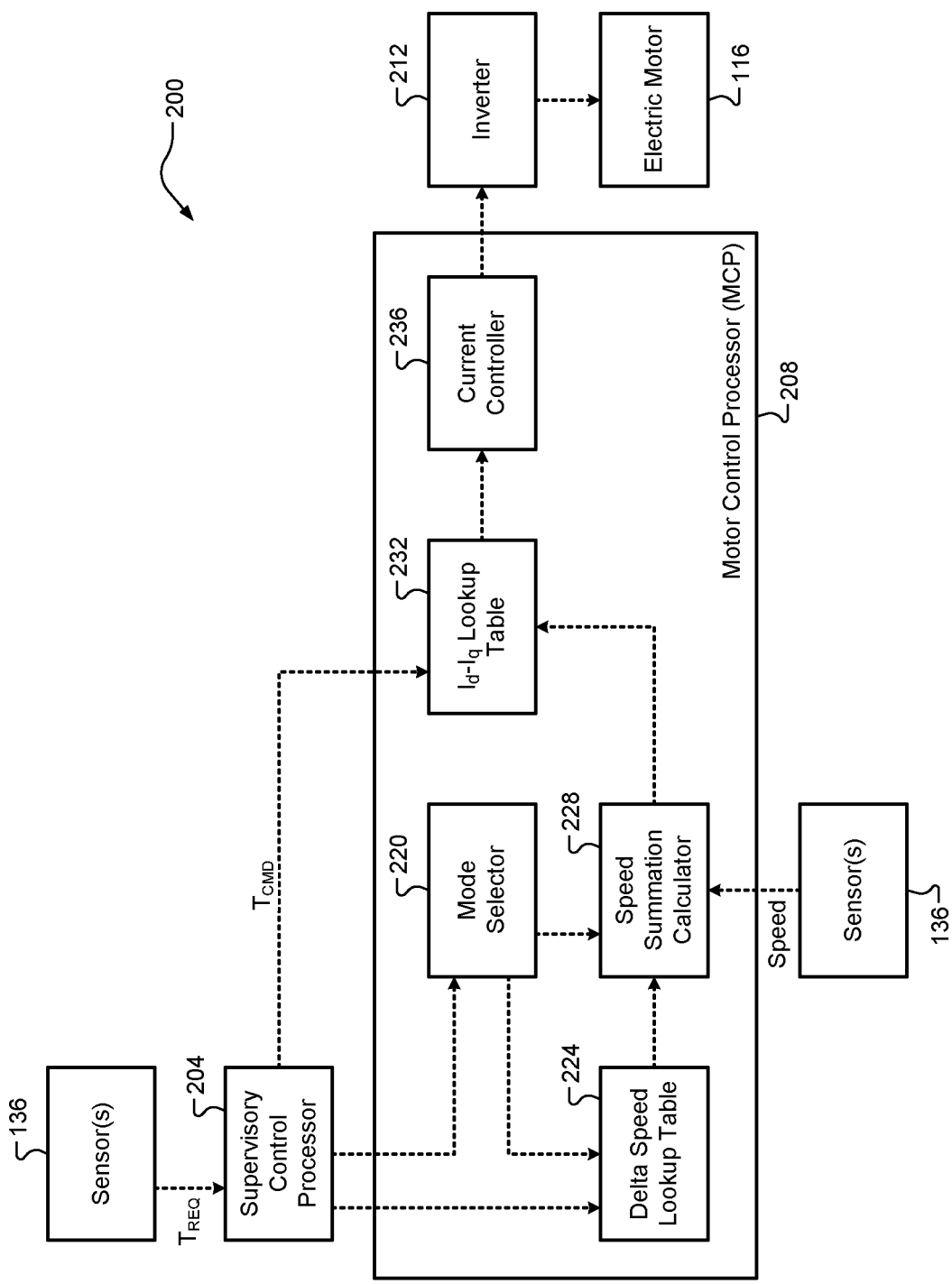
FIG. 2 is a functional block diagram of an example architecture for the multi-loss motor torque control system according to the principles of the present application.

Referring now to FIG. 2 and with continued reference to FIGS. 1 and 4, a functional block diagram of an example architecture 200 for the multi-loss torque control system 104 (e.g., the controller 132) of the electrified vehicle 100 is illustrated. The architecture 200 is generally divided into a supervisory control module or processor 204, a motor control module or processor (MCP, 208), and an inverter 212. The majority of the architecture 200 relating to the present application is included in the motor control processor MCP 208. The supervisory control processor 204 initially determines a mode (normal or multi-loss torque control) and a torque command (TCMD) based on the driver/operator torque request. For the multi-loss torque control mode, the supervisory processor controller 204 sends an enable signal to the mode selector 220 and a desired loss (corresponding to the desired heat energy loss of the electric motor 116). The delta speed lookup table (ΔSpeed LUT, or $LUT_1$) 224 is a calibrated LUT that determines a speed delta (ΔSpeed) when the multi-loss torque control mode is enabled and based on the desired loss from the supervisory control processor 204.

In the multi-loss torque control mode, the speed summation calculator 228 is configured to receive the speed delta ΔSpeed and the actual speed ($Speed_{ACT}$) of the electric motor 116 and calculates a sum of these values ($Speed_{ACT}$+ ΔSpeed). This speed sum is output to a current command LUT ($I_d$-$I_q$ LUT, or $LUT_2$) 232 that is configured to, based on the speed sum and the torque command TCMD, determines current commands ($I_d$, $I_q$) for controlling the electric motor 116. These current commands are fed to a current controller 236 that, in conjunction with an inverter 212, generates pulse-width modulated (PWM) control signals to power the electric motor 116 accordingly.

Figure 3:
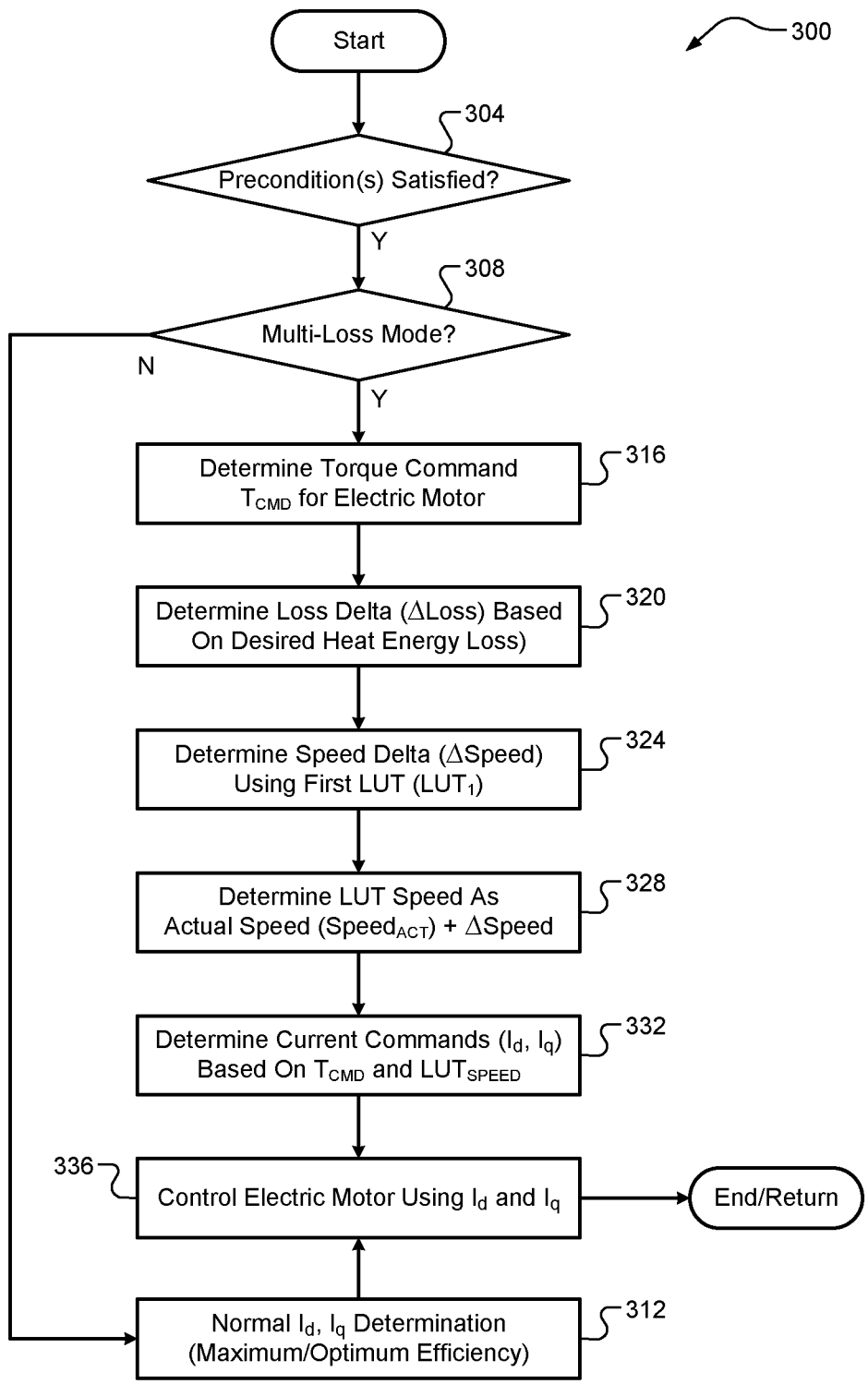
FIG. 3 is a flow diagram of an example multi-loss torque control method for an electric motor of an electrified vehicle according to the principles of the present application.

Referring now to FIG. 3 and with continued reference to FIGS. 1-2 and 4, a flow diagram of an example multi-loss torque control method 300 for an electric motor of an electrified vehicle according to the principles of the present application is illustrated. While the electrified vehicle 100 and its electric motor 116 are specifically referenced for explanatory purposes, it will be appreciated that this method 300 could be applicable to any suitable electrified vehicle having an electric motor and a corresponding heat exchanger or similar system for capturing the excess heat energy from the electric motor. At 304, the controller 132 optionally determines whether a set of one or more preconditions are satisfied. This could include, for example only, that the electrified powertrain 108 is operable and powered-up and there being no malfunctions or faults of the electrified powertrain 108 present. When false, the method 300 ends or returns to 304. When true, the method 300 proceeds to 308.

At 308, the controller 132 determines whether the multi-loss torque control mode is enabled. This could be based on a variety of preconditions such as, but not limited to, the heated component 140 having a temperature less than a threshold temperature (e.g., a low temperature or cold high voltage battery system 120) and the electrified vehicle 100 being parked or conducting low speed operation. Other preconditions could also be required, such as the SOC of the high voltage battery system 120 being sufficient to allow for a period of inefficient operation. When true, the method 300 proceeds to 316. Otherwise, the method 300 proceeds to 312 where normal operation of the electric motor 116 and the electrified powertrain 108 is conducted and the method 300 ends or returns to 304.

At 316, the controller 132 determines the torque command TCMD for the electric motor (e.g., based on the torque request $T_{REQ}$ as measured/determined by sensor(s) 136). At 320, the controller 132 determines the loss delta or delta loss ΔLoss based on the desired heat energy loss for the electric motor 116. At 324, the controller 132 determines the speed delta or delta speed ΔSpeed using the first LUT (LUT$_1$) 224. At 328, the controller 132 determines the LUT speed LUT$_{SPEED}$ as a sum of the actual speed SPEED$_{ACT}$ of the electric motor 116 (from sensor(s) 136) and the delta speed ΔSpeed.

At 332, the controller 132 determines the current commands $I_d$, $I_q$ based on the torque command TCMD and the LUT speed LUT$_{SPEED}$. Finally, at 336, the controller 132 controls the electric motor 116 using the current commands $I_d$, $I_q$ (e.g., using inverter 212), which causes the electric motor 116 to generate excess heat energy that is captured by the heat exchanger 144 and used to heat the heated component 140, such as the high voltage battery system 120. The method 300 then ends or returns to 304 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A multi-loss torque control system for an electric motor of an electrified vehicle, the multi-loss torque control system comprising:
    a set of sensors configured to determine (i) an actual speed of the electric motor, (ii) a requested torque for generation by the electric motor, and (iii) a desired heat energy loss by the electric motor; and
    a controller configured to selectively operate the electric motor in a multi-loss torque control mode including:
        determining a torque command for the electric motor based on the requested drive torque;
        determining a speed loss for the electric motor based on the electric motor's actual speed and its desired heat energy loss;
        generating current commands for the electric motor based on its determined torque command and speed loss;
        controlling the electric motor using the generated current commands;
        capturing heat energy lost by the electric motor using a heat exchanger system; and
        using the captured heat energy in the heat exchanger system to heat a component of the electrified vehicle.

2. The multi-loss torque control system of claim 1, wherein the controller is configured to utilize a first calibrated lookup table (LUT) to determine a speed delta based on the desired heat energy loss by the electric motor.

3. The multi-loss torque control system of claim 2, wherein the controller is configured to determine the speed loss as a sum of the actual speed and speed delta of the electric motor.

4. The multi-loss torque control system of claim 3, wherein the controller is further configured to utilize a second calibrated LUT to determine the current commands based on the torque command and the speed loss for the electric motor.

5. The multi-loss torque control system of claim 1, wherein the component of the electrified vehicle is a high voltage battery system configured to power the electric motor.

6. The multi-loss torque control system of claim 5, wherein the set of sensors are further configured to determine an actual temperature of the high voltage battery system and enable the multi-loss torque control mode for the electric motor when the actual temperature is below a calibratable threshold.

7. The multi-loss torque control system of claim 1, wherein the component of the electrified vehicle is an in-cabin heating component of the electrified vehicle.

8. The multi-loss torque control system of claim 1, wherein the controller controls the electric motor irrespective of motor flux.

9. The multi-loss torque control system of claim 8, wherein the electric motor is an interior permanent magnet synchronous motor (IPMSM).

10. A multi-loss torque control method for an electric motor of an electrified vehicle, the method comprising:
    determining, by the controller, a torque command for the electric motor based on a requested torque for generation by the electric motor from the set of sensors;
    determining, by the controller, a speed loss for the electric motor based on an actual speed and a desired heat energy loss for the electric motor from the set of sensors;

generating, by the controller, current commands for the electric motor based on its determined torque command and speed loss;

controlling, by the controller, the electric motor using the generated current commands;

capturing, by the controller, heat energy lost by the electric motor using a heat exchanger system; and using, by the controller, the captured heat energy in the heat exchanger system to heat a component of the electrified vehicle.

11. The method of claim 10, further comprising utilizing, by the controller, a first calibrated lookup table (LUT) to determine a speed delta based on the desired heat energy loss by the electric motor.

12. The method of claim 11, further comprising determining, by the controller, the speed loss as a sum of the actual speed and speed delta of the electric motor.

13. The method of claim 12, further comprising utilizing, by the controller, a second calibrated LUT to determine the current commands based on the torque command and the speed loss for the electric motor.

14. The method of claim 10, wherein the component of the electrified vehicle is a high voltage battery system configured to power the electric motor.

15. The method of claim 14, wherein the set of sensors are further configured to determine an actual temperature of the high voltage battery system and the multi-loss torque control method for the electric motor is performed when the actual temperature is below a calibratable threshold.

16. The method of claim 10, wherein the component of the electrified vehicle is an in-cabin heating component of the electrified vehicle.

17. The method of claim 10, wherein the controller controls the electric motor irrespective of motor flux.

18. The method of claim 17, wherein the electric motor is an interior permanent magnet synchronous motor (IPMSM).

* * * * *